Sept. 27, 1966 C. E. MENDENHALL ET AL 3,275,990

SIGNAL COUPLING SYSTEMS FOR DIGITAL REPRODUCING SYSTEMS

Filed Aug. 21, 1962 2 Sheets-Sheet 1

SUNG PAL CHUR
CHARLES MENDENHALL
INVENTORS

BY *Robert G. Clay*

ATTORNEY

Sept. 27, 1966 C. E. MENDENHALL ETAL 3,275,990

SIGNAL COUPLING SYSTEMS FOR DIGITAL REPRODUCING SYSTEMS

Filed Aug. 21, 1962

2 Sheets-Sheet 2

INVENTORS
SUNG PAL CHUR
CHARLES MENDENHALL
BY
Robert G. Clay
ATTORNEY

United States Patent Office 3,275,990
Patented Sept. 27, 1966

3,275,990

SIGNAL COUPLING SYSTEMS FOR DIGITAL REPRODUCING SYSTEMS

Charles E. Mendenhall and Sung P. Chur, Los Angeles, Calif., assignors to Ampex Corporation, Redwood City, Calif., a corporation of California Filed Aug. 21, 1962, Ser. No. 218,260
15 Claims. (Cl. 340—172.5)

Figure 1:
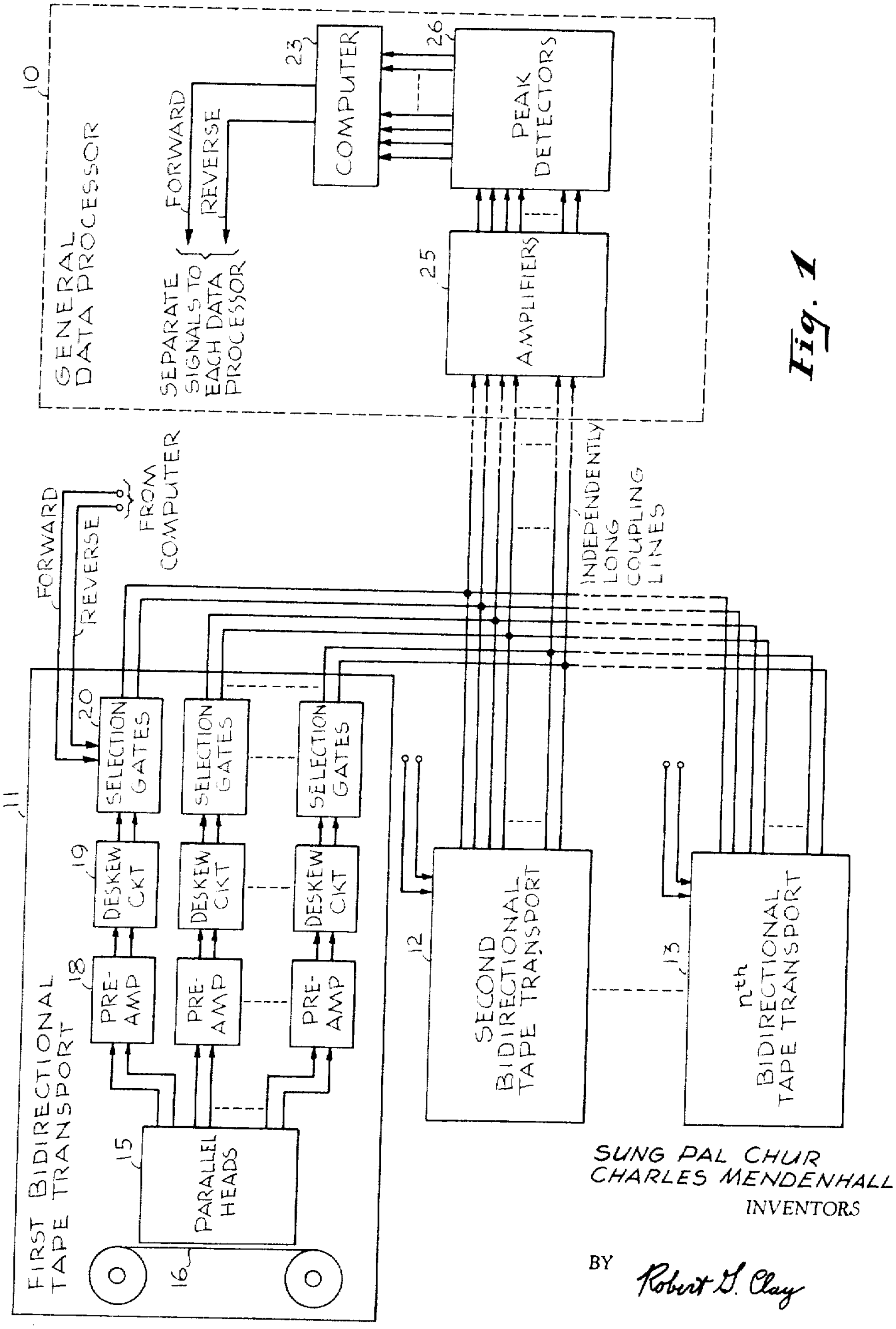

This invention relates to digital data processing systems and more particularly to data processing systems which reproduce and utilize data from magnetic tape transport and storage systems.

Magnetic tape systems are widely used as high capacity memories for digital data processing systems because they permit storage of vast amounts of data at relatively low cost but with high reliability. For commercial and business applications so much data must be stored and processed that a number of magnetic tape transports must often be used with a single central data processor. In order to be compatible with the high data rate capability of the data processor each of these magnetic tape transports should be able to record and reproduce digital data at comparable if not equal rates. To this end, data is usually recorded at high bit densities, such as 200 or 556 binary digits (bits) per linear inch of tape and the tape is moved at high speed, e.g. 75 inches per second or more. Through the use of multi-track recording, a number of bits may be recorded in parallel to represent individual characters, symbols and numbers in a form suitable for direct usage in the data processor.

The need for accuracy in digital data processing systems is such that the higher bit densities and data rates must be achieved without decrease in reliability. All of the tape transports must be equally interchangeable, and fully compatible with the central data processor, under all starting, stopping and transfer conditions. Furthermore, each system should operate bidirectionally.

It is possible, as known to workers in the art, to achieve this uniformity between different tape transports by incorporating extra equipment to make the waveforms of the data pulses uniform and to keep the pulses in proper time relation to each other. Amplifiers, delay elements and associated processing circuitry at each of a number of different tape transports, however, materially increase the cost of an overall system and incidentally increase the probability of component failure.

System designers have, heretofore, nevertheless incorporated such extra circuitry in order to assure the desired uniformity. A particularly troublesome problem is introduced by what may be called the static skewing effect. This effect results from minute misalignments in the nominally parallel reproducing heads in a tape system. A related problem is that of providing data signals of sufficient signal-to-noise ratio at the data processor.

The static skewing problem is virtually unavoidable because a minute head displacement will, at high tape densities and high tape speeds, result in a relatively large time error in a reproduced signal. It is evident that head misalignment effects will be different for the different directions of tape movement.

The use of separately located transport mechanisms may, with large systems, require that the signals be conducted over long distances to the central data processor. In order to avoid excessive attenuation and loss of signal, or errors because of line variations, transients and like noise effects, the reproduced signals are usually raised to an adequate voltage level by amplifier circuits at the tape transport itself, and then coupled by expensive low-loss, low-capacitance lines to the central system. Apart from the element of added cost previously mentioned, this technique suffers from the deficiency that transient spikes of high amplitude will still usually appear as data signals to the processing circuits. Often, these arrangements also necessitate the use of extra switching equipment and amplifiers at the tape transports in order to control tape transport selection and to operate bidirectionally.

It is therefore an object of the present invention to provide an improved signal coupling system for digital processing systems.

Another object of the present invention is to provide improved means for reliably coupling signals reproduced by a digital tape transport to a data processor.

A further object of the present invention is to provide an improved circuit for overcoming static skewing effects in a bidirectional magnetic tape transport system.

Another object of the present invention is to provide an improved system for coupling reproduced signals from any of a number of tape transport systems to a single centrally located data processing system efficiently, reliably and with low cost.

These and other objects of the present invention are realized by a system which provides static deskewing at the tape mechanism but couples only low level current signals from the tape mechanism to the data processor. In a specific example of such a system, as employed with a number of tape transports and a common central data processor, a single delay line element is employed for static deskewing in each channel in a manner which automatically accommodates the degree of deskewing, once it is adjusted, to the particular direction of tape movement. After preamplification, the signals in each channel are coupled to the central tap of a multi-tapped delay line having output terminals at each end. The central tap is set to compensate for head misalignment in the given channel, for a given direction of tape movement. This setting also serves with the circuit arrangement for the opposite direction of tape movement, because output signals are taken from an end of the delay line determined by whether the tape is being driven forward or in reverse. The selection is made by activating one of two double-ended difference amplifiers, each of which is coupled to receive output signals from a different end of the delay line. The difference amplifiers provide the data pulses in the form of low level variations of a differential current flow in two output conductors. Although the normal current level is itself relatively low, the data pulses are readily detected after conduction over long lines to a current-responsive amplifying device at the central data processor. The differential current variations remain the same irrespective of the line variations and transient voltage spikes. Through this combination, the overall system is materially reduced in size and complexity even though no sacrifice is made in operating performance.

Figure 2:
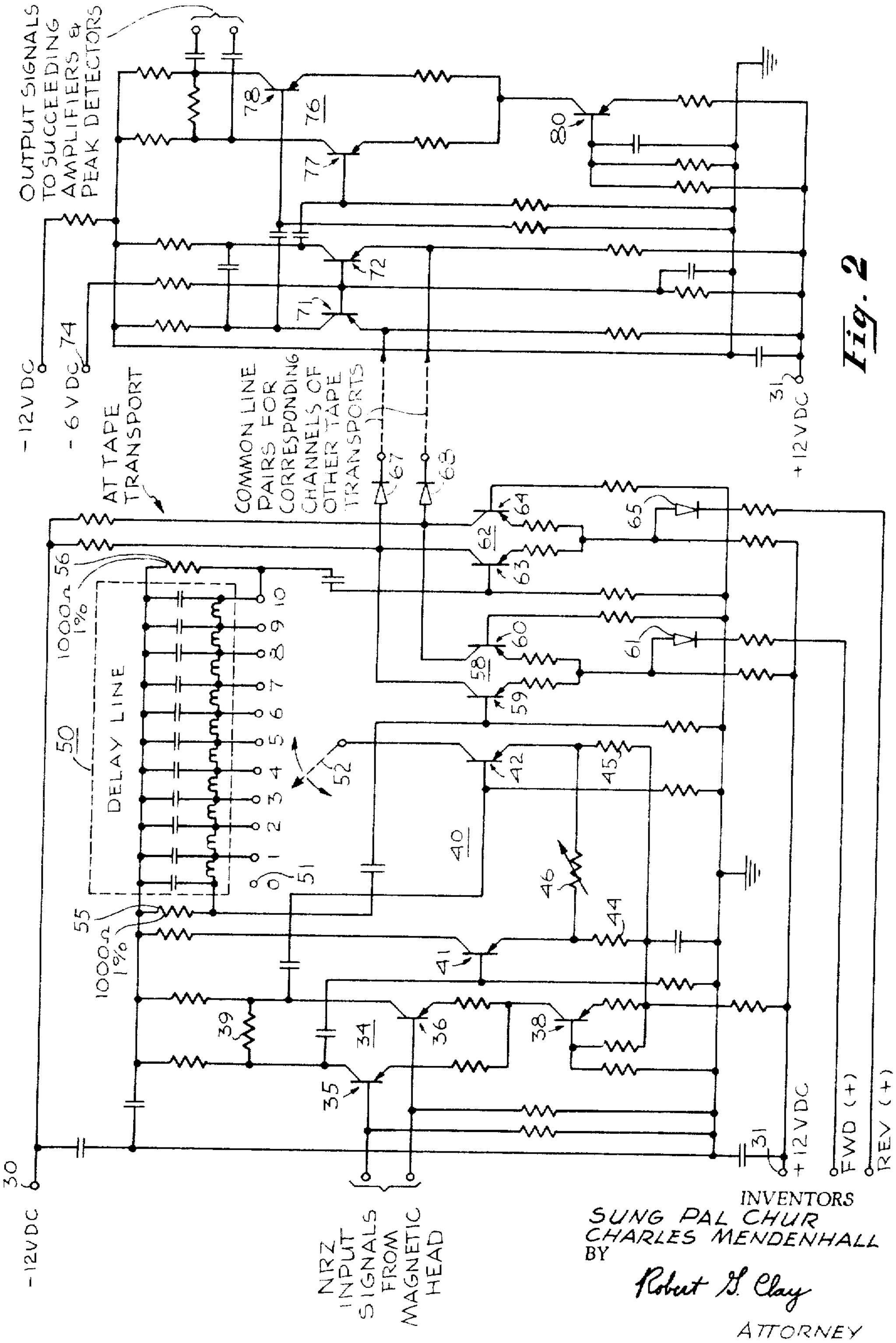

A better understanding of the invention may be had by reference to the following description, taken in conjunction with the accompanying drawings, in which:

FIG. 1 is a block diagram representation of the organization of the system including a number of tape transports and a digital data processor, and FIG. 2 is a schematic diagram of circuits in accordance with the invention for employment in the arrangement of the system of FIG. 1.

FIG. 1 illustrates one manner in which circuits in accordance with the invention may be employed in data processing systems. A typical system for processing high volumes of business data includes a single central data processor 10 which may be coupled to any of a number of bidirectional tape transports 11, 12 or 13. Depending upon the purposes of the installation, the single data processor may operate with an arbitrary number of tape transports, as many as 40 being used in known applications. The number of tape transports might be further increased in the extremely large data processing center using a number of general purpose and special computing machines.

The individual transports 11, 12 and 13, here indicated as the first, second and *n*th transports respectively, may thus necessarily be separated by relatively long distances from the central data processor 10. Each transport (only one of which is illustrated in partial detail but all of which may be alike) includes a multi-head transducer 15 for reproducing signals recorded in the parallel tracks on the tape 16. The parallel heads 15 (indicated only generally) at each of the tape transports provide input signals for the parallel data or signal channels. Guide and advance mechanisms for bidirectional movement of a tape 16 may be conventional and will be understood to be included although they have not been shown. In each of the tape transport signal channels the pickup coil (not shown) of the associated head is coupled through a separate preamplifier 18, a deskew circuit 19, and a selection gate 20 to provide the data signals to a central data processor 10.

The signals applied to the deskew circuits 19 in the parallel channels from the magnetic tape 16 may vary from true parallelism in time relative to each other, depending upon variations in head displacement, as mentioned previously. Thus, each of the deskew circuits 19 must be capable of providing a unique time correction for signals in its individual channel. Each deskew circuit 19 must also be adjustable, inasmuch as head wear may require that the set of heads be changed. Additionally, the deskew circuit 19 must compensate for static skewing effects in both the forward and reverse directions of tape movement, which effects will differ for the two directions of movement.

Control signals from the central data processor 10 to each of the tape transports 11, 12 and 13 determine which tape transport will be used and which mode (forward or reverse) will be employed. Forward and reverse control signals to the selection gates 20 at each tape transport concurrently govern the coupling of the proper signal channels to the central data processor 10. Like signal conductors from each of the transports are coupled together, to provide a single set of lines for applying data pulses through amplifiers 25 and peak detectors 26 to the computer 23. It will be observed that although static deskewing is provided at the tape transport units, only low level amplification of the signals is used until the central data processor 10 is reached. At the central system, a common set of amplifiers 25 and associated circuits suffices for providing data pulses to the computer 23.

The circuits illustrated in FIG. 2 provide a particularly advantageous example of the arrangement of the preamplifiers, deskew circuits and amplifiers of the arrangement of FIG. 1 as disposed in a single data channel.

The circuit of FIG. 2 employs transistor circuits, the transistors generally being of the PNP conductivity type, although it is evident that transistors of opposite conductivity type may be used with appropriate reversal of power supply voltage polarities, or that vacuum tube devices may alternatively be used. Supply voltages are obtained from a −12 volt D.C. supply 30 and a +12 volt D.C. supply 31, and common connections are made at a ground point. Input signals, recorded by the non-return to zero (NRZ) method, are derived directly from the magnetic head circuits of the tape transport system at a pair of input terminals. As is well known, reproduction of NRZ signals provides positive-going and negative-going pulses to distinguish the "0" and "1" binary states. The pulses are usually considerably rounded in waveform and may be of relatively low amplitude. Reproduced signals which are directly out-of-phase are applied to the input terminals of the circuit of FIG. 2 by appropriate couplings (not shown) from the head circuits, although a conventional phase splitter circuit may be used if desired.

The out-of-phase signals are coupled first to the deskewing and preamplifying circuitry which is located at the separate tape stations, then coupled to the common circuits and transmitted by the independently long coupling lines to the central station. It must be understood that what is illustrated in FIG. 2 is the circuitry for a single channel of a single tape transport and the coupling from that channel to the corresponding common channel at the central station, and that each of such circuits contributes to different aspects of the invention.

Input signals from the input terminals are applied to a double-ended first difference amplifier 34 comprising a pair of transistors 35, 36. The transistors 35, 36 receive the oppositely-varying input signals from the two input terminals at their respective bases, so that the signals are further differentially amplified because the two transistors 35, 36 are similarly coupled. The emitter currents of both transistors 35, 36 are drawn from the 12 volt supply 31 through a transistor 38 which is coupled in a grounded base configuration and accordingly functions as a constant current source. With a fixed base voltage at the transistor 38, and a substantially constant emitter-base voltage, the collector current of the transistor 38 remains substantially constant despite common mode line variations. The emitter and collector currents of the two transistors 35, 36 of the first difference amplifier 34 are substantially equal in the absence of an input signal, but become unequal when input signals are applied. A current limiter resistor 39 is shown coupling the collector circuits of the two transistors 35, 36 so as to prevent the occurrence of excessive peaks if a high level input signal is applied.

The signals from the two halves of the first difference amplifier 34 are applied separately to different ones of a pair of transistors 41, 42 which are connected as a second difference amplifier 40. This second amplifier 40 provides an adjustable gain, current varying single-ended signal to the subsequent delay line. For this purpose, the emitter circuits of the two transistors 41, 42 are coupled from a common circuit junction to the +12 volt D.C. supply 31 through a pair of like resistors 44, 45. The gain variation may be controlled by setting an adjustable resistor 46 coupled between the emitter circuits. Variations in collector current of the second transistor 42 of this amplifier provide the driving signal for the subsequent delay line.

The delay line 50 is a multi-tapped, multi-element unit having a plurality of tap points 51 and a common intermediate selector 52 for applying the input signal to any one of the tap points 51. In a practical delay line example, eleven taps equally spaced along the ten delay line sections are provided. The delay line 50 is coupled at each end to separate precision terminating resistors 55, 56 which constitute the output terminals for the delay line.

The total length, and time of delay, for the delay line 50 will be in the microsecond region, normally three to five microseconds for the tape speeds commonly used. The center selector 52 is positioned at any of the taps 51, as needed to bring the pulses from the associated head into proper time relation to the pulses from the remaining parallel heads. The single setting suffices for both directions of tape movement, as is explained in greater detail below.

Input signals from the separate output terminals of the delay line 50 are applied to a selection gate arrangement formed of a third difference amplifier 58 and a fourth difference amplifier 62. The arrangements are alike and only the third difference amplifier 58 need be described. As with the previous difference amplifiers, the emitter circuits of two transistor amplifiers 59, 60 of like conductivity type are resistively coupled together and to the +12 volt D.C. supply 31. Output signals are derived from the collector circuits of both amplifiers 59, 60, although input signals are applied only to the base of the first transistor 59, to alter the division of current between the halves of the amplifier 58. In addition, however, the entire amplifier 58 is normally maintained cut off by reverse biasing, through the application of a forward (FWD) control signal of negative polarity (e.g. approximately −6 volts) through a negatively poled diode 61 coupled to the emitter circuit. The negative control signal holds the junction point between the emitters of the transistors 59, 60 below ground potential to maintain both halves 59, 60 of the third difference amplifier 58 nonconducting.

When a positive control signal is applied to either the third or fourth difference amplifier 58, 62, however, that particular amplifier is activated for providing signals to the central data processor. Output signals are derived at a pair of output terminals through isolating diodes 67, 68 which are connected to the like halves 58, 63 and 60, 64 of the difference amplifiers 58, 62 respectively. This arrangement has the added advantage of providing an extremely simple method of switching between the separate tape transports as well as selecting the deskewing compensation in accordance with the direction of tape movement.

The output terminals from each of the tape transport channels are coupled together, and along common lines of independently long length to the central station. These lines therefore consist of a differential pair for each channel, and particular note should be taken of the fact that no special requirements are imposed as to the type of line which must be used. Typically, the common line pairs may extend for hundreds of feet between the furthest tape transport unit and the point of coupling in the central data processor.

At the central data processor, each conductor pair is coupled to drive a current sensitive amplifying device, such as a pair of base-coupled transistors 71, 72. The separate input conductors are coupled to differentially vary the emitter currents of the two transistors 71, 72, the bases of which are held at a like selected potential by a common coupling to an intermediate point of a voltage divider formed between the +12 volt source 31 and a −6 volt source 74. Output signals are taken from the collectors of the two transistors 71, 72, and coupled respectively to the two halves of final difference amplifier 76. As in the previous difference amplifiers, separate transistors 77, 78 are coupled to receive the differential signals at their base terminals, output signals are taken from the collector circuits and provided to succeeding amplifiers and peak detector circuits of the data processing system. This difference amplifier 76 is also coupled to a constant current source provided by a grounded base transistor 80 coupled to the emitter circuits of both the transistors 77, 78 of the amplifier 76.

The arrangement of the circuit of FIG. 2 advantageously combines the functions of preamplification, deskewing, mode selection and signal transmission in a particularly economical manner without the sacrifice of reliability. The delay line 50 is initially set, with respect to the amount of relative misalignment of the associated magnetic head, to compensate for the time error introduced in the data pulses in the associated channel. For example, if one of the heads only is misaligned with respect to the others, all of the delay lines but one (for that tape transport) would be set at the midpoint position of the selector 52. The delay line 50 coupled to the one misaligned head would be set to one side of this midpoint by an appropriate amount to compensate for the existing head positioning error, for that direction of tape movement. Further, the output signal for the given direction of tape movement is hereafter taken from the proper output terminal which of course is the same in all instances. The single-ended signal variation derived from the selected end of the delay line is converted to the differential variation in current flow and is thereafter coupled to the central data processor.

Once the selection of delay has been made for one direction of tape movement, moreover, the same setting holds for the opposite direction of tape movement, although the opposite selection gate is activated for the provision of output signals. This can be done because delay settings are symmetrical about a midpoint. Therefore, the compensation needed relative to the midpoint varies in complementary fashion for the two directions of tape movement, and the use of a centrally driven delay line with oppositely selected output terminals satisfies this requirement.

The selection gates form useful parts of the combination for several reasons. They not only provide a degree of amplification of the time-compensated signal, but also convert the signal to the differentially varying current signal which is used to advantage for long line transmission. Further, the selection gates permit the mode of operation to be electronically selected under control of the central data processing system or by other means, and also contribute to the isolation between like channels of the system.

The signal coupling system may be referred to as an analog line driver, or a linear signal line driver, to distinguish from the pulse driver or high amplitude driving systems of the prior art. In systems constructed in accordance with the example of FIG. 2, 400 microampere variations imposed on a 4 milliampere current are typical values for the signal which is transmitted from the tape transports to the central system. Despite these low levels, the differential variations at the first amplifier pair 71, 72 at the central data processor provide reliable representations of the data pulses, independently of common mode components in the signal, noise effects, or signal attenuation over long line lengths.

While there have been described above and illustrated in the drawings various forms of signal coupling circuits, static deskewing circuits, and data transmission circuits in accordance with the invention, it will be appreciated that the invention is not limited thereto. Accordingly, the invention should be considered to include all forms, variations and embodiments falling within the scope of the appended claims.

What is claimed is:

1. A system for providing substantially uniform, deskewed data pulses from any of a number of bidirectional magnetic tape transport mechanisms to a central digital data system, despite the use of long coupling lines between individual ones of the tape transport mechanisms and the central system, the system comprising: a plurality of tape transport mechanisms, each of the tape transport mechanisms including means reproducing data in a selected number of separate channels, each of the tape transport mechanisms also including preamplifier means, static deskew means and selection gate means for each of the channels, the static deskew means including a delay line having output terminals at each opposite end, and adjustable center tap means coupled to receive signals from the preamplifier means, the selection gate means including a pair of differential current amplifiers, each coupled to a different output terminal of the delay line and each being actuable in response to a different direction of tape movement; a central digital data processing system, including a plurality of differential current amplifiers corresponding in number to the separate channels from an individual tape transport mechanism; and a plurality of current conductor pairs, each coupling differential current amplifiers in like channels of each of the tape transport mechanisms to the differential current amplifier in the corresponding channel of the central digital data processing system.

2. A system for providing deskewed, substantially uniform, reproduced data pulses from any of a number of different magnetic tape transports to a digital data processing system comprising: static deskewing means at each of the tape transports, the static deskewing means for each channel at each of the transports including current driven, center tapped delay line means, the center taps being selectively coupled to receive reproduced data pulses; selection gate means coupled to controllably receive signals from one of the ends of the delay line means; differential current conductor means coupling the signals in each channel from the tape transports to the central data processing system; and amplifier means at the digital data processing system coupled to receive signals from the differential current conductor means.

3. A system for providing substantially uniform digital data pulses over numbers of channels from independent stations to a central station despite static skewing effects at the independent stations and relatively long intervening lengths of line, comprising: a number of preamplifier means, each responsive to the digital data pulses in a different channel at the individual stations; a number of delay line deskewing means, each coupled to receive signals from a different preamplifier means at the individual stations; a number of differential current amplifier means, each having a pair of output terminals and coupled to a different delay line deskewing means; a number of current conductor pairs each coupling the pair of output terminals of a different differential current amplifier means to the central station; and a number of current responsive amplifier means, each coupled to receive signals from different corresponding current conductor pairs from the independent stations.

4. A system for providing substantially uniform digital data pulses within each of a number of signal channels coupling a number of independent stations to a central station despite static skew effects arising at the independent stations and relatively long distances between the independent stations and the central station, each channel comprising: preamplifier means responsive to digital data pulses subject to static skew effects; delay line deskew means having selectable tap positions and a pair of oppositely disposed output terminals; means coupling the preamplifier means to a selected tap position of the delay line deskew means; a pair of normally reverse-biased difference amplifiers, each coupled to receive signals from a different output terminal of the delay line deskew means and each arranged to be forward biased by an applied control signal, the difference amplifiers each having a pair of output terminals and providing differential current flow thereat; a pair of current conductors each coupled to corresponding output terminals of the pair of difference amplifiers and each coupling the independent station to the central station; and current responsive amplifier means coupled to the pair of conductors at the central station.

5. A signal coupling system for transmitting parallel digital data pulses over long line lengths comprising: means providing the digital data pulses in parallel channels; delay line means in each of the channels for adjusting the time relationship of pulses therein; first amplifier means in each of the channels coupled to receive pulses from the delay line means, the first amplifier means producing differentially varying signal currents; second, current-responsive amplifier means for receiving the digital data; and a plurality of conductor pairs coupling the first amplifier means to the second amplifier means.

6. A system for providing substantially uniform digital data pulses subject to static skew within each of a number of signal channels coupling a number of independent bidirectional data reproducers to a central processing system, the system providing forward and reverse control signals and each data reproducer having a number of channels, each channel comprising: preamplifier means responsive to digital data pulses subject to static skew effects; delay line deskew means having selectable central tap positions and a pair of oppositely disposed output terminals; means coupling the preamplifier means to a selected tap position of the delay line deskew means, the tap position being selected relative to a midpoint position in correspondence to the amount and sense of static skew effect in the channel; a pair of normally reverse-biased transistor difference amplifiers, each coupled to receive input signals from a different output terminal of the delay line deskew means and each coupled to be forward biased by a different one of the forward and reverse control signals; each difference amplifier having a pair of output terminals and providing differential signal currents thereat, like output terminals of the difference amplifiers being coupled together; and a pair of current conductors each coupled to a different set of output terminals of the difference amplifiers and coupling signal currents therefrom to the central processing system.

7. A circuit for eliminating static skew effects in reproduced signals from a bidirectionally driven magnetic tape transport mechanism, the circuit comprising: preamplifier means responsive to the reproduced signals; delay line means including a variably positioned central tap means, the central tap means being coupled to receive signals from the preamplifier means, the delay line means also including oppositely disposed output terminals; and switching means controllable in accordance with the direction of movement of the tape and coupled to the output terminals of the delay line means for deriving output signals from either selected one of the output terminals.

8. A circuit for adjusting the time relation of a given pulse to other nominally coincident pulses provided in nominal parallelism from a data reproducer, the data reproducer operating bidirectionally to provide different lead-lag relationships between the nominally parallel pulses, the circuit comprising: delay line means having a pair of output terminals and a number of tap points intermediate the output terminals; means coupling pulses to be adjusted in time to a selected tap point of the delay line means; and gating means coupled to the output terminals of the delay line means for deriving pulses individually from the terminals in correspondence to the direction of operation of the data reproducer and without change of the selected tap point.

9. A static deskewing circuit responsive to pulses generated by a magnetic head from a magnetic tape and adjusting the pulses correctly in time relative to a selected time for either direction of tape movement relative to the head, the circuit comprising: first amplifier means responsive to the generated pulses for providing amplifier pulse representations; a multi-tapped electrical delay line network having a pair of oppositely disposed output terminals and providing a selected total delay; tap selector means coupling the first amplifier means to a controllably selectable tap of the electrical delay line network; second amplifier means coupled to receive signals from one output terminal of the electrical delay line network, the second amplifier means being actuable in response to one direction of tape movement; and third amplifier means coupled to receive signals from the other output terminal of the electrical delay line network, the third amplifier means being actuable in response to the other direction of tape movement.

10. A static deskewing circuit responsive to pulses generated by a multi-head magnetic transducer from a magnetic tape and adjusting the pulses in time such that pulses from each head of the transducer are reproduced in time coincidence for both tape directions despite head misalignment, the circuit comprising: a multi-tapped electrical delay line network having a pair of oppositely disposed output terminals and providing a selected total delay; tap selector means coupling input pulses to a selected one of the taps of the electrical delay line network; first and second difference amplifiers, each comprising a pair of transistors having base, emitter and collector terminals, the emitters being coupled together and the collector terminals providing output terminals; means coupling each of the output terminals of the delay line network to the base terminal of a given transistor within the different difference amplifiers; and biasing means controllable in accordance with the direction of tape movement and coupled to the emitter terminals of the transistors of the first and second difference amplifiers for selecting pulses from either of the output terminals of the electrical delay line network.

11. A bidirectional tape transport system for reproducing multi-channel digital data with minimization of static skew effects comprising the combination of bidirectional tape driving means, multi-channel signal reproducing means in operative relationship to the tape, multi-channel preamplifier means coupled to receive signals in the separate channels from the reproducing means, a plurality of individual delay lines, each coupled to receive signals from a different one of the preamplifiers, each of the delay lines having a controllably positionable central tap coupled to receive the signals and including a pair of output terminals at opposite ends of the delay line, and a plurality of switching means, each of the switching means being associated with a different one of the delay lines to select output signals from either of the terminals of the delay line associated therewith, and means responsive to the direction of movement of the tape relative to the reproducing means for operating the switching means.

12. A system for coupling signals from any of a number of magnetic tape transports to a central digital data processing system over relatively long lengths of line including the combination of a plurality of magnetic tape transport systems, each including preamplifiers providing relatively low level, amplitude varying, signal currents, a central digital data processing system, a plurality of conductor pairs, each coupling signal currents for a given different signal channel of the tape transport systems to the central digital data processing system, and a number of current amplifier means within the digital data processor, each coupled to receive signals from a different conductor pair.

13. A signal coupling system for conducting digital data signals derived at independent stations to a central station at relatively low amplitude levels over independently long lengths of line despite common mode and transient noise effects and comprising: preamplifier means at each of the independent stations responsive to the data signals for providing differentially varying signal currents representative thereof at a pair of output terminals for each data channel; paired conductor means coupling the output terminals for each data channel to the central station; and current responsive amplifier means coupled to each pair conductor means at the central station.

14. A signal coupling system for transmitting data pulses over long line lengths at low amplitude levels comprising: double-ended amplifier means responsive to the data pulses for generating differentially varying signal currents at a pair of output terminals; current-responsive amplifier means having a pair of input terminals; and a pair of conductor means providing the desired long line length and coupling the output terminals of the double-ended amplifier means to the input terminals of the current-responsive amplifier means.

15. A signal coupling system for conducting digital data signals derived in separate channels at independent stations to a central station at relatively low amplitude levels over independently long lengths of line, despite common mode and transient noise effects and comprising: a plurality of amplifier means, each in a different signal channel at the different independent stations and each responsive to data signals therein and including a pair of output terminals, each of the amplifier means providing differentially varying signal currents at the output terminals thereof; a plurality of signal isolating means, each coupled to the output terminals of a different amplifier means; a plurality of paired conductor means, each coupling like signal channels from the independent stations together and to the central station; and a number of current responsive amplifier means, each coupled to a different paired conductor means at the central station.

References Cited by the Examiner

UNITED STATES PATENTS

| | | | |
|---|---|---|---|
| 2,905,930 | 9/1959 | Golden | 340—172.5 |
| 2,907,010 | 9/1959 | Speilberg | 340—172.5 |
| 2,970,300 | 1/1961 | Witt et al. | 340—174.1 |
| 2,972,128 | 2/1961 | Eckert | 340—172.5 |
| 2,977,541 | 3/1961 | Talambiras | 330—69 |
| 2,977,547 | 3/1961 | Talambiras | 330—69 |
| 2,991,452 | 7/1961 | Welsh | 340—172.5 |
| 3,003,113 | 10/1961 | MacNichol | 330—69 |
| 3,025,503 | 3/1962 | Perry | 340—172.5 |
| 3,076,183 | 1/1963 | Willoughby | 340—174.1 |
| 3,103,000 | 9/1963 | Newman et al. | 340—174.1 |

ROBERT C. BAILEY, *Primary Examiner.*

MALCOLM A. MORRISON, *Examiner.*

P. L. BERGER, *Assistant Examiner.*